US009152414B2

(12) United States Patent
Sahoo et al.

(10) Patent No.: US 9,152,414 B2
(45) Date of Patent: Oct. 6, 2015

(54) SYSTEM AND METHOD TO SELECT COMPATIBLE OPEN-SOURCE SOFTWARE AND COMPONENTS FOR DEVELOPED OR CONCEPTUALIZED SOLUTION

(71) Applicants: Subhranshu Sahoo, Maharashtra (IN); Ganapathy Narayanan, Maharashtra (IN)

(72) Inventors: Subhranshu Sahoo, Maharashtra (IN); Ganapathy Narayanan, Maharashtra (IN)

(73) Assignee: Tata Consultancy Services Limited, Maharashtra (IN)

( * ) Notice: Subject to any disclaimer, the term of this patent is extended or adjusted under 35 U.S.C. 154(b) by 27 days.

(21) Appl. No.: 13/746,360

(22) Filed: Jan. 22, 2013

(65) Prior Publication Data
US 2013/0254744 A1    Sep. 26, 2013

(30) Foreign Application Priority Data

Mar. 26, 2012  (IN) ............................ 814/MUM/2012

(51) Int. Cl.
*G06F 9/44* (2006.01)
*G06F 21/10* (2013.01)
(52) U.S. Cl.
CPC .. *G06F 8/73* (2013.01); *G06F 8/71* (2013.01); *G06F 21/105* (2013.01)
(58) Field of Classification Search
None
See application file for complete search history.

(56) References Cited

U.S. PATENT DOCUMENTS

| 6,810,389 | B1* | 10/2004 | Meyer .......................... 705/59 |
| 7,552,093 | B2 | 6/2009 | Levin |
| 8,401,973 | B1* | 3/2013 | Biswas et al. ................... 705/59 |
| 8,713,560 | B2* | 4/2014 | Neumann et al. ............. 717/174 |
| 2004/0039916 | A1* | 2/2004 | Aldis et al. .................... 713/177 |
| 2004/0068734 | A1 | 4/2004 | Bond |
| 2006/0036652 | A1* | 2/2006 | Cope et al. .................... 707/200 |
| 2007/0271190 | A1 | 11/2007 | Foster |
| 2008/0154965 | A1* | 6/2008 | Pedersen .................... 707/104.1 |
| 2008/0209393 | A1* | 8/2008 | Evensen et al. .............. 717/108 |
| 2008/0209399 | A1 | 8/2008 | Bonnet |
| 2008/0256516 | A1* | 10/2008 | Chaar et al. .................. 717/121 |
| 2010/0185686 | A1* | 7/2010 | Weigert et al. ................ 707/803 |
| 2010/0242028 | A1* | 9/2010 | Weigert ........................ 717/131 |
| 2013/0091488 | A1* | 4/2013 | Koutyrine et al. ............ 717/120 |

OTHER PUBLICATIONS

Kechagia et al. Open Source Licensing Across Package Dependencies. 14th Panhellenic Conference on Informatics (PCI), Sep. 10-12, 2010, pp. 27-32, Retrieved on [Jun. 11, 2015] Retrieved from the Internet: URL<http://ieeexplore.ieee.org/stamp/stamp.jsp?tp=&arnumber=5600285>.*

(Continued)

*Primary Examiner* — Thuy Dao
*Assistant Examiner* — Cheneca Smith
(74) *Attorney, Agent, or Firm* — Hayes Soloway, PC

(57) ABSTRACT

The present invention relates to a system and method for verifying the compatibility among the software components used in the software solution using an auto-license compatibility verifier. Further, the present invention provides the method for enabling the auto-license compatibility verifier, a tool for automatically and dynamically mapping the licensing information of the software components which are used in the software solution with respect to the already stored licensing information which are stored in the database.

4 Claims, 2 Drawing Sheets

(56) References Cited

OTHER PUBLICATIONS

German et al.Understanding and Auditing the Licensing of Open Source Software Distributions.IEEE 18$^{th}$ International Conference on Program Comprehension (ICPC), Jun. 30, 2010, pp. 84-93. Retrieved on [Jun. 11, 2015] Retrieved from the Internet: URL<http://ieeexplore.ieee.org/stamp/stamp.jsp?tp=&arnumber=5521758>.*

Daniel. M. German; Yuki Manabe; and Katsuro Inoue "Ninka, a license identification tool for Source Code".

Robert C. Seacord; David Mundie and Somjai Boonsiri "K-BACEE: A Knowledge-Based Automated Component Ensemble Evaluation Tool".

David A. Wheeler "How to Evaluate Open Source Software / Free Software (OSS/FS) Programs".

* cited by examiner

SYSTEM AND METHOD TO SELECT COMPATIBLE OPEN-SOURCE SOFTWARE AND COMPONENTS FOR DEVELOPED OR CONCEPTUALIZED SOLUTION

FIELD OF THE INVENTION

The present invention generally relates to a system and method for verifying compatibility among software components, more particularly open source software.

BACKGROUND OF THE INVENTION

Developing or building software solutions, especially from scratch is a time consuming and a logical process which requires lots of manual based coding skills. A number of proprietary and non-proprietary software codes or source codes are available on interne or elsewhere which is used for software development. Over the past years, the software developers either individuals or those who are working for an organization are using open source software, one of the non-proprietary type software which are publically available on different sources for developing the software solutions. The source code available in the different open source software is actually used for developing the software solutions. This source code of the open source software comes under different licensing restrictions such as GNU General Public License (GPL), GNU Lesser General Public License (LGPL), Berkeley Software Distribution License (BSD) etc.

Since, these open source software have licensing restrictions, the software developers come across with difficulties regarding the compatibility among the different available open source software due to their licensing restrictions which may be used for developing the software solution. Ensuring the compatibility of these open source software among them is a challenging task.

In the currently known techniques, the selection of the appropriate open source software and thereafter performing compatibility check among them are manually or semi-automatically conducted. These manual and semi-automatic processes require a lot of manual intervention as well as time.

Hence, there is a lack of dynamically verifying the compatibility of different software components such as open source software which are used in the software solution. Moreover, yet another issue related to the verification of the compatible open source software is to ensure the software developers that the verified open source software are free from any licensing implications retaining the intellectual property (IP) rights as well as proprietorship. So, there is a long felt need of a system and method which is capable for verifying the compatibility among the open source software used in the software solution and further ensuring the software developers for exploiting the software solution commercially retaining the IP rights.

OBJECTS OF THE INVENTION

The primary objective of the present invention is to provide a system and method enabling dynamic verification of compatibility among software components by tracing licensing information of said software components relative to the previously stored licensing information in a database.

Another object of the present invention is to enable a method for receiving required software components along with their licensing information for a developed or conceptualized software solution.

Yet another object of the present invention is to enable a method for categorizing the received software components based on their licensing information.

Yet another object of the present invention is to enable a method for mapping the licensing information of the categorized software components in relative to the previously stored licensing information stored in the database.

Yet another object of the present invention is to enable a method for ensuring compatibility among the categorized software components upon mapping the licensing information.

Yet another object of the present invention is to enable a method for displaying a pre-defined queries based upon the mapped information.

Yet another object of the present invention is to enable a method for prompting a user for responding upon the displayed pre-defined queries for confirming compatibility or in-compatibility of the software components.

Yet another object of the present invention is to enable a method for regularly updating the pre-defined queries stored in the database based on the user response.

Yet another object of the present invention is to enable a method for generating a report for the verified compatible software components based upon the user response.

SUMMARY OF THE INVENTION

Before the present system and method, enablement are described, it is to be understood that this invention is not limited to the particular system, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present invention.

The present invention introduces the computer-implemented system and computer-implemented method for verifying compatibility among two or more software components by dynamically tracing or mapping the licensing information of the software components in relative to the pre-stored licensing information stored in the database. Further, the computer-implemented system and the computer-implemented method are configured for displaying queries and prompting the user to respond upon the displayed queries for confirming the compatibility or in-compatibility of the software components. The said pre-defined queries are stored in the database and are regularly updated based upon the user response.

In one aspect of the present invention the computer-implemented method is provided for verifying compatibility among two or more software components of the developed or conceptualized software solution, characterized by dynamically tracing licensing information of the software components in relative to the pre-stored licensing information which are stored in the database based on a user input, wherein the said computer-implemented system comprises of various processor executable program modules including a receiving module which is configured for receiving the required software components along with their licensing information that are used in the developed or conceptualized software solution. A categorizing module, another processor executable programmed module is configured for categorizing the received software components based on their licensing information. Upon receiving and categorizing the software components, a mapping module is configured for mapping the licensing information of the categorized software components with the licensing information which is previously stored in the database for ensuring compatibility among said categorized software components. Based on the mapping information, an intelligent query module is configured for displaying pre-defined queries to the user and further prompting the user for responding upon the displayed pre-defined queries for confirming the compatibility or incompatibility of the software components. The said pre-defined queries are stored in the database of the computer-implemented system and are regularly updated based upon the user response. Upon receiving the user response, a generation module is configured for generating a report for the verified and compatible software components.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings various stages of the invention; however, the invention is not limited to the specific system components and methods disclosed in the drawings.

DETAILED DESCRIPTION OF THE INVENTION

Figure 1:
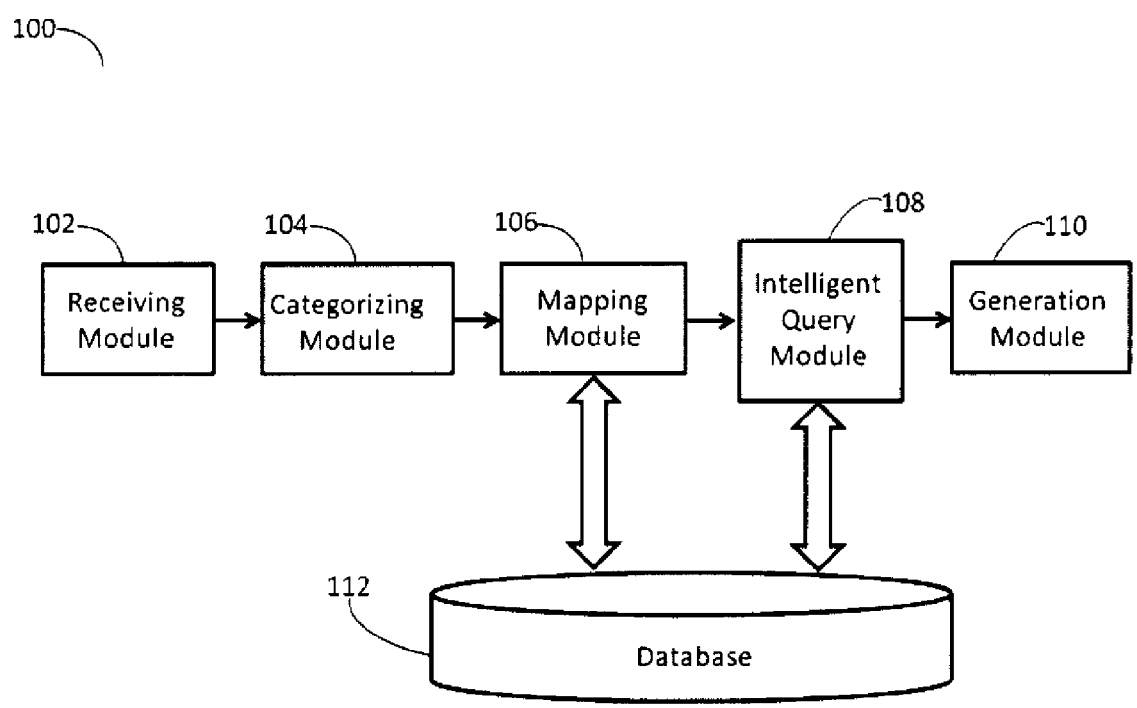
FIG. 1 is the block diagram of the system (100) illustrating the multiple embodiments of the present invention.

The invention will now be described with respect to various embodiments. The following description provides specific details for understanding of, and enabling description for, these embodiments of the invention. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The invention generally provides the computer-implemented system and the computer-implemented method for verifying compatibility among the software components using an auto-license compatibility verifier, characterized by enabling the auto-license compatibility verifier for dynamically tracing the licensing information of the software components in relation to the previously stored licensing information which is stored in the database for ensuring the compatibility of the software components, wherein the database is stored in the memory of the said computer-implemented system.

In one embodiment of the present invention the computer-implemented system provides the auto-license compatibility verifier, which is a tool, wherein the said auto-license compatibility verifier comprises of various processor-executable program modules, each module performs a particular set of task upon execution of the processor. One of the modules of the auto-license compatibility verifier is the receiving module which is configured for receiving required software components along with their licensing information that are used in the developed or conceptualized software solution. The licensing information may include different categories of the software licenses such as strong copyleft license, weak copyleft license or permissive license or the licensing information may also include version of the software components and its license type and version number such as GNU General Public License (GPL), GNU Lesser General Public License (LGPL), Berkeley Software Distribution License (BSD) etc. After receiving the required software components, a categorizing module upon execution of the processor is configured for categorizing the received software components based on their licensing information. Upon categorization of the software components, a mapping module, one of the processor-executable module of said computer-implemented system is further configured for mapping the licensing information of the received and thereafter categorized software components with respect to the previously stored licensing information which is stored in the database for ensuring the compatibility of the software components among them, wherein the database is stored in the memory of the said computer-implemented system.

After completion of mapping of the licensing information of the software components, an intelligent query module upon execution of the processor is configured to display the pre-defined queries to the user upon which the user is prompted to respond for confirming the compatibility or incompatibility of the software components. The said pre-defined queries are stored in the database of the system and regularly get updated on the basis of the user response.

Further, upon receiving the user response on the pre-defined queries, a generation module upon execution of the processor is configured for generating a report for the verified and compatible software components that are used in the developed or conceptualized software solution retaining the IP rights and thus making the software solution to be redistributed or commercially exploitable.

In another embodiment of the present invention the computer-implemented method is considered for verifying the compatibility of the software components among them, characterized by dynamically tracing the licensing information of the software components relative to the previously stored licensing information which are stored in the database, said database is stored in the memory of the computer-implemented system. For enabling the verification process, set of processor-enabled steps are performed by the processor-executable programmed modules, wherein the said steps includes; receiving the required software components along with their licensing information that are used in the developed or conceptualized software solution. The licensing information may include different categories of the software licenses such as strong copyleft license, weak copyleft license or permissive license or the licensing information may also include version of the software components and its license type such as GNU General Public License (GPL), GNU Lesser General Public License (LGPL), Berkeley Software Distribution License (BSD) etc. On receiving the required software components, step for categorizing the received software components are performed by the categorizing module, one of the process-executable programmed modules.

After categorizing the received software components, step of mapping the licensing information of the categorized software components with respect to the previously stored licensing information which are stored in the database are performed by the mapping module upon execution of the processor, wherein the database where the licensing information is stored is further stored in the memory of the said computer-implemented system. The step of mapping of licensing information is performed for ensuring the compatibility among the software components.

Upon completion of the mapping process, step of displaying the pre-defined queries to the user and further prompting the user to respond upon the displayed queries is performed by the intelligent query module on execution of the programmed instructions stored in the memory of such intelligent query module. Depending upon the response made by the user, the confirmation of the compatibility or incompatibility of the software components is decided by the computer-implemented system. The pre-defined queries are also stored in the database, wherein the said database is stored in the memory of the computer-implemented system. Thus, upon receiving the response of the user, step for generating the report is performed by the generation module, one of the processor-executable programmed modules for the verified and compatible software component that are used in the developed or conceptualized software solution retaining the IP rights and hence making the software solution to be redistributed or commercially exploitable.

Thus, the above described computer-implemented system having the processor-executable programmed modules and the computer-implemented method having the said processor-enabled steps performed by the said processor-executable programmed modules are provided for automatically and dynamically verifying the compatibility among the software components which are used in the developed or conceptualized software.

Next, the preferred embodiments of the present invention will be described below based on drawings.

FIG. 1 is the block diagram of the system (100) illustrating the multiple embodiments of the present invention. The system (100) comprises a processor, a memory, a database (112) and the auto-license compatibility verifier, a tool, wherein the said auto-license compatibility verifier further comprises of a set of processor-executable programmed modules such as a receiving module (102), a categorizing module (104), a mapping module (106), an intelligent query module (108) and a generation module (110). In accordance with various embodiments of the present invention, the methods described herein are intended for operation as computer programs modules running on a computer processor.

The receiving module (102) is configured for receiving the required software components along with their licensing information that are used in the developed or conceptualized software solution. The required software components can be the open source components or self-developed software. When the software solution is developed or conceptualized, the developers are to be very sure about the compatibility issues of the software components such as open source software which may arise when the said software solution is commercially exploited. Every open source software are released with a licensing restriction such as like, GPL, LGPL, BSD etc and compatibility among theses open source software depends upon their licensing restrictions. The licensing restrictions are the part of the licensing information which has been used several times in the present invention. The licensing information may include different categories of the software licenses such as strong copyleft license, weak copyleft license or permissive license or the licensing information may also include version of the software components and its license type such as GNU General Public License (GPL), GNU Lesser General Public License (LGPL), Berkeley Software Distribution License (BSD) etc. On the basis of the licensing information of the received software components like open source software, the categorizing module (104) upon execution of the processor categorizes the received software components.

Upon categorization of the software components, an another processor-executable programmed module i.e., the mapping module (106) is configured for mapping the licensing information of the categorized software components in relative to the previously stored licensing information which are already stored in the database (112), wherein the database (112) is stored in the memory (not shown in the figure) of the said auto-license compatibility verifier. The step of mapping is performed for ensuring the compatibility of the received and thereafter categorized software components among them which are used in the developed or conceptualized software solution. On the basis of the mapping information received and after ensuring the compatibility among the software components, an intelligent query module (108) is configured for displaying the pre-defined queries to the user upon which the user is prompted to respond. The respond made by the user is further processed by the auto-license compatibility verifier for confirming whether the software components of which the licensing information is mapped are compatible or incompatible among them or not. The displayed pre-defined queries are also stored in the database (112), wherein the said database (112) is stored and regularly updated in memory (not shown in the figure) of the said auto-license compatibility verifier. The updation of the said pre-defined queries depends on the basis of the user response received when the user is prompted for responding to the said pre-defined queries.

After completion of the mapping process by the mapping module (106) and receiving the user response on the pre-defined queries displayed to the user by the intelligent query module (108), one of the another processor-executable programmed modules i.e., the generation module (110) further executes the verification process of the software components upon execution of the programmed instructions stored in the memory (not shown in the figure) of such generation module (110). The generation module (110) is configured for generating a report which is based on the user response made by the user upon the displayed pre-defined queries for the verified and compatible software components. Upon verification of the compatibility among the software components which are used in the developed or conceptualized software solution, the software developers are ensured that the developed software solution is free from the licensing implications and can be redistributed or commercially exploited in the market.

Figure 2:
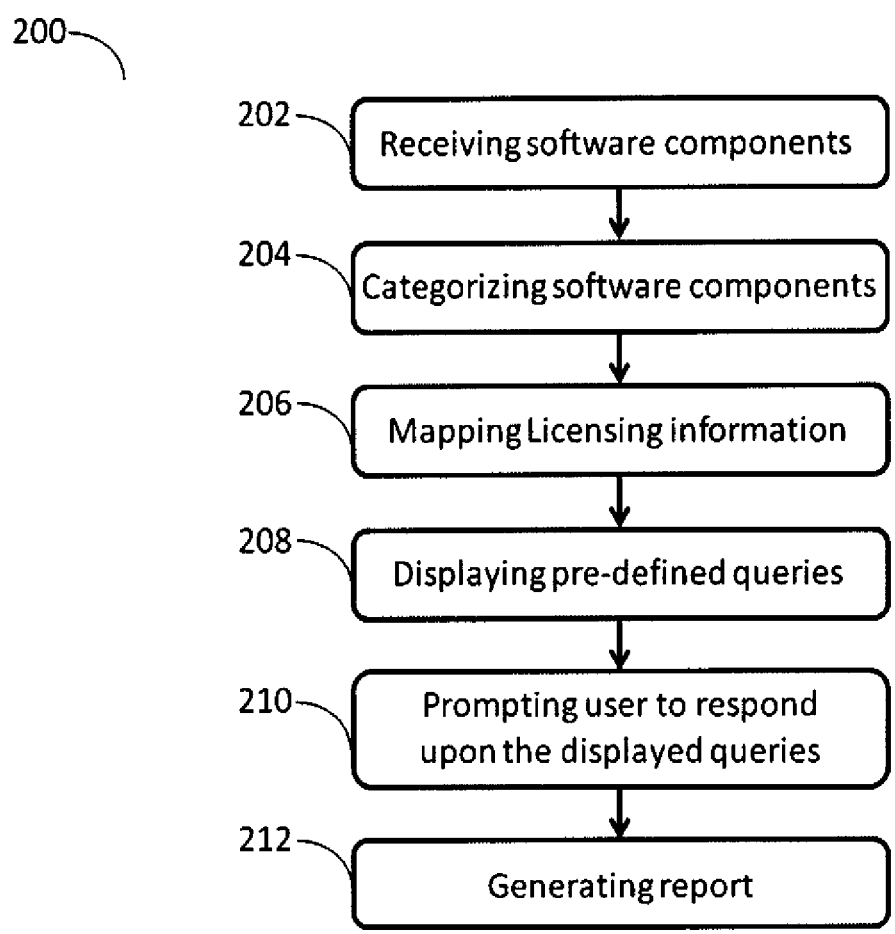
FIG. 2 is the flow diagram (200) for verifying compatibility among the software components of the developed or conceptualized software solution.

FIG. 2 is the flow diagram (200) for verifying compatibility among the software components of the developed or conceptualized software solution. A computer-implemented system having a set of processor-executable program modules is provided for verifying the compatibility among the software components which are used in the developed or conceptualized software solution. For enabling the verification process among the software components, set of processor-enabled steps are performed by the processor-executable programmed modules, wherein the steps includes; receiving the software components (202) along with their licensing information. Software components can be the open source software or self-developed software as per the present invention, wherein the each software component is released with the licensing restrictions. Due to these licensing restrictions, the said software component may or may not be compatible among them. So, for ensuring the IP rights of the developed or conceptualized software solution, developers are required to verify the compatibility of these software components i.e., open source software or self-developed software which are used in the developed or conceptualized software solution. The licensing restrictions are the part of the licensing information which has been used several times in the present invention. The licensing information may include different categories of the software licenses such as strong copyleft license, weak copyleft license or permissive license or the licensing information may also include version of the software components and its license type such as GNU General Public License (GPL), GNU Lesser General Public License (LGPL), Berkeley Software Distribution License (BSD) etc.

Depending upon the licensing information of the received software components, the step of categorizing the software components (204) is performed by the categorizing module (104 of FIG. 1). Upon categorization of the software components, step of mapping licensing information (206), i.e., mapping the licensing information of the software components with respect to the previously stored licensing information in the database (112 of FIG. 1) is further performed by the mapping module (106 of FIG. 1). The said database (112 of FIG. 1) is stored in the memory (not shown in the figure) of the said auto-license compatibility verifier. The step of mapping of licensing information (206) is performed for ensuring the compatibility among the categorized software components.

After completing the mapping of the licensing information (206) for all the categorized software components, step of displaying pre-defined queries (208) is performed by the intelligent query module (108 of FIG. 1) based on the mapped information. Further, the said intelligent query module (108 of FIG. 1) is also configured for prompting the user to respond upon the displayed pre-defined queries (210) for confirming the compatibility or incompatibility of the software components. The displayed pre-defined queries are stored in the database (112 of FIG. 1), wherein the said database (112 of FIG. 1) is stored and regularly updated in memory (not shown in the figure) of the said auto-license compatibility verifier. The updation of the said pre-defined queries depends on the basis of the user response received when the user is prompted to respond upon the displayed pre-defined queries (210).

Further, upon receiving the user response on the displayed pre-defined queries, step for generating report (212) is performed by the generation module (110 of FIG. 1) for the verified and the compatible software components which are used in the developed or conceptualized software solution. The generated report suggest the user for the selection of the software components which are used in the developed or conceptualized software solution, wherein the said software components are retaining the IP rights and hence making the developed or conceptualized software solution to be available for redistribution or for making it commercially exploitable without having any licensing implications.

Thus, the computer-implemented system having the processor-executable programmed modules and the computer-implemented method having the said processor-enabled steps performed by the said processor-executable programmed modules is provided for verifying the compatibility of the software components used in the developed or conceptualized software solution.

BEST MODE OF CARRYING OUT THE INVENTION

According to the present invention, the computer-implemented system and the computer-implemented method is configured for verifying the compatibility among the software components, characterized by dynamically tracing the licensing information of the of the software components in relative to the previously stored licensing information which are stored in the database of the said computer-implemented system.

According to an exemplary embodiment of the present invention, ABCsoft is considered as the developed or conceptualized software solution for which three different open source software are used i.e., Linux, OSS_2 and OSS_3. Each of the open source software is having their own licensing restrictions or licensing information. For example, Linux is having licensing type L1, OSS_2 is having licensing type L2 and OSS_3 is having licensing type L3. Before the software solution ABCsoft is redistributed or commercially exploited in the market, it is necessary for the developers to verify whether the used open source software components are compatible among themselves or not? Thus, the said auto-license compatibility verifier having a set of processor-executable programmed modules, wherein each of its modules are configured for verifying the compatibility of the open sources software i.e., Linux, OSS_2 and OSS_3 used in the software solution ABCsoft.

The various steps are performed by the said processor-executable programmed modules for verifying the compatibility among the software components i.e., open source software Linux, OSS_2 and OSS_3 having their license type L1, L2 and L3 respectively are as follows:

Step 1:—The receiving module (102 of FIG. 1) receives the three open source software i.e., Linux, OSS_2 and OSS_3 with version number along with their licensing information i.e., its license type L1, L2 and L3 respectively. The said license type is part of the licensing information, wherein the licensing information may also include different categories of the software licenses such as strong copyleft license, weak copyleft license or permissive license or the licensing information may also include version of the open source software.

Step 2:—Upon receiving open source software Linux, OSS_2 and OSS_3, the categorizing module (104 of FIG. 1) is configured for categorizing the received open source software depending upon their licensing information i.e., L1, L2 and L3.

Step 3:—The mapping module (106 of FIG. 1) upon categorization of the open source software maps the licensing information i.e., L1, L2 and L3 for each of the said open source software i.e., Linux, OSS_2 and OSS_3 with respect to the previously stored licensing information which are stored in the database (112 of FIG. 1). The mapping module (106 of FIG. 1) selects and maps each of the open source software, one at a time. For each of the open source software the mapping process is followed by the displaying and prompting process, wherein the mapping process is performed by the mapping module (106 of FIG. 1) and the displaying and then prompting process is performed by the intelligent query module (108 of FIG. 1), both mapping module and the intelligent query module repetitively and interchangeably executes depending upon the number of the received open source software, wherein their working is as follows:

Step 3(a):—The mapping module (106 of FIG. 1) selects the open source software Linux and maps its licensing information i.e., L1 with the licensing information previously stored in the database (112 of FIG. 1) of the said computer-implemented system for ensuring the compatibility of the selected open source software Linux. Upon completion of mapping, the intelligent query module (108 of FIG. 1) displays a set of queries based upon the mapped information. According to the present scenario, the displayed query is: "Will the source code be modified?" upon which user made a response i.e., "No". The respective response made by the user is stored in the database (112 of FIG. 1) of the said computer-implemented system for further process and for generating the report.

Step 3(b):—After having done with the open source software Linux and its licensing information L1, the mapping module (106 of FIG. 1) selects the next open source software i.e., OSS_2 and maps its licensing information i.e., L2 with the licensing information previously stored in the database (112 of FIG. 1) of the said computer-implemented system for ensuring the compatibility of the selected open source software OSS_2. Again, upon completing the mapping process, the intelligent query module (108 of FIG. 1) displays a set of queries based upon the mapped information. According to the present scenario, the displayed sets of queries are: "Will the source code be modified?" upon which user made a response i.e., "No"; "Will OSS_2's source code be compiled with your own code? i.e., the code of ABCsoft" upon which user makes a response i.e., "No" and "Will your solution (ABCsoft) dynamically link to OSS_2 through OSS_2's APIs?" upon which the user make the response "Yes". As similar to the previous step 3(a), the responses made by the user is stored in the database (112 of FIG. 1) of the said computer-implemented system for further processing and for generating the report.

Step 3(c):—As similar to step 3(a) and 3(b), the mapping module (106 of FIG. 1) selects the next open source software i.e., OSS_3 and maps its licensing information i.e., L3 with the licensing information previously stored in the database (112 of FIG. 1) of the computer-implemented system for ensuring the compatibility of the of the selected open source software OSS_3. Thus, upon completion of the mapping process, the intelligent query module (108 of FIG. 1) displays a set of queries based upon the mapped information. As per the present scenario, the displayed query is: "Will the source code i.e., OSS_3's source code be modified?" upon which the user makes a response "Yes".

Step 4:—The responses made by the user when the user is prompted by the intelligent query module (108 of FIG. 1) in step 3(a), 3(b) and 3(c) upon completion of the mapping process, the responses are stored in the database (112 of FIG. 1) of the computer-implemented system. Based on the responses made by the user in the said steps 3(a), 3(b) and 3(c), the generation module (110 of FIG. 1) generates a report for the confirming the compatibility or incompatibility of the open source software Linux, OSS_2 and OSS_3. The generated report as per the present scenario is shown in the below table 1:

TABLE 1

Generated Report by the generation module for verifying the compatibility of the open source software used in the software solution ABCsoft.

a. Your solution i.e., ABCsoft is to be redistributed or commercially exploited, and hence obligations to license terms is mandatory.
b. As Linux code is not being modified, it is assumed that Linux is the deployment platform, a pre-requisite for running your application.
c. The open source software OSS_2's source code is not being modified, and is being used as a library linked dynamically from your solution i.e., ABCsoft through published APIs. The license of OSS_2 is LGPL
d. The open source software OSS_3's source code is being modified, and hence may be compiled along with your solution i.e., ABCsoft. The license of OSS_3 is Berkeley Software Distribution (BSD) license.
e. The selected combination of the open source software i.e., Linux, OSS_2 and OSS_3 along with its licenses allows you to redistribute or commercially exploit your software solution i.e., ABCsoft under any license term you may choose.
f. You are under no obligation to release the source code of your solution i.e., ABCsoft.
g. You may choose to retain the IP rights of the solution.

Thus, based on the generated report, it is verified that the selected open source software i.e., Linux, OSS_2 and OSS_3 which are used in the software solution ABCsoft are compatible with their licensing information i.e., their licensing type. Further, the software solution can be redistribution or can be commercially exploited without having any licensing implications.

The illustrations of arrangements described herein are intended to provide a general understanding of the structure of various embodiments, and they are not intended to serve as a complete description of all the elements and features of methods and system that might make use of the components described herein.

The methodology and techniques described with respect to the present invention can be performed using a computer-implemented system or other computing device within which a set of instructions, when executed, may cause the said computer-implemented system to perform any one or more of the methodologies discussed above. The said computer-implemented system may include a processor embedded within the said computer-implemented system which is configured for executing the said programmed instructions or the said set of instructions. The said computer-implemented system is configured from different modules; each module is configured for executing programmed instructions or set of instruction to perform a particular task. According to the embodiments of the present invention, the computer-implemented system may also operate as a standalone device. In some embodiments, the said computer-implemented system may be connected (e.g., using a network) to other computing devices. In a networked deployment, the computer-implemented system may operate in a client-server terminology. The said computer-implemented system may be configured to work along with a server computer, a client user computer, a personal computer (PC), a tablet PC, a laptop computer, a desktop computer, a control system, machine capable of executing a set of instructions (sequential or otherwise) that specify actions to be taken by that machine.

In accordance with various embodiments of the present invention, the computer-implemented methods described herein are intended for operation as software programs running on a computer processor—[processor embedded within the said computer-implemented system].

Although the invention has been described in terms of specific embodiments and applications, persons skilled in the art can, in light of this teaching, generate additional embodiments without exceeding the scope or departing from the spirit of the invention described herein.

We claim:

1. A computer-implemented method for verifying compatibility among a plurality of software components used in a software solution, the method comprising steps of:

receiving the plurality of software components along with licensing information corresponding to the plurality of software components, wherein the licensing information comprises one or more licensing categories and one or more license types, and wherein the one or more licensing categories are selected from a group comprising of a strong copyleft license, a weak copyleft license, and a permissive license, and wherein the one or more license types comprises a GNU General Public License (GPL), a GNU Lesser General Public License (LGPL), and a Berkeley Software Distribution License (BSD);

categorizing the plurality of software components based on the licensing information;

mapping the licensing information of the plurality of software components with previously stored licensing information stored in a database;

displaying a set of pre-defined queries, corresponding to the plurality of software components, to the user based upon the mapping of the licensing information;

receiving a user response corresponding to each pre-defined query of the set of pre-defined queries to verify the compatibility amongst the plurality of software components, wherein the database is regularly updated based upon the user response; and generating a report, based on the user response, comprising verification details indicating the compatibility corresponding to each of the plurality of software components used in the software solution.

2. The method of claim 1, wherein the plurality of software components are selected from a group comprising of open source software (OSS), self-developed software and combinations thereof.

3. A system for verifying compatibility among a plurality of software components used in a software solution, the system comprising:

a processor;

a memory coupled to the processor, wherein the processor executes a plurality of modules stored in the memory, and wherein the plurality of modules comprising:

a receiving module to receive the plurality of software components along with licensing information corresponding to the plurality of software components, wherein the licensing information comprises one or more licensing categories and one or more license types, and wherein the one or more licensing categories are selected from a group comprising of a strong copyleft license, a weak copyleft license, and a permissive license, and wherein the one or more license types comprises a GNU General Public License (GPL), a GNU Lesser General Public License (LGPL), and a Berkeley Software Distribution License (BSD);

a categorizing module to categorize the plurality of software components based on the licensing information;

a mapping module to map the licensing information of the plurality of software components with previously stored licensing information stored in a database;

an intelligent query module to:

display a set of pre-defined queries, corresponding to the plurality of software components, to the user based on the mapping of the licensing information, and receive a user response corresponding to each pre-defined query of the set of pre-defined queries to verify the compatibility among the plurality of software components, wherein the database is regularly updated based upon the user response; and a generation module to generate a report, based on the user response, comprising verification details indicating compatibility corresponding to each of the plurality of software components used in the software solution.

4. The system of claim 3, wherein the plurality of software components are selected from a group comprising of open source software (OSS), self-developed software and combinations thereof.

* * * * *